United States Patent [19]

Peterson

[11] 4,328,767
[45] May 11, 1982

[54] RETRACTABLE LEASH COLLAR

[76] Inventor: Edwin R. Peterson, 415 Broadway, P.O. Box 449, Boise, Id. 83701

[21] Appl. No.: 252,797

[22] Filed: Apr. 13, 1981

[51] Int. Cl.³ .............................................. A01K 27/00
[52] U.S. Cl. ..................................... 119/109; 119/106
[58] Field of Search .............................. 119/109, 106; 242/107.3

[56] References Cited

U.S. PATENT DOCUMENTS 3,250,253  5/1966  Galin ..................................... 119/109
4,018,189  4/1977  Umphries et al. .................. 119/109

Primary Examiner—Jay N. Eskovitz
Attorney, Agent, or Firm—Lee R. Schermerhorn

[57] ABSTRACT

A retractor mechanism is mounted on the collar adjacent the buckle, the weight of these parts holding them under the animal's neck when the leash is retracted. A guide ring half way around the collar provides a stop for a handle on the free end of the leash when the leash is retracted, thus positioning the handle on top of the animal's neck when the leash is not in use. A semicircular spring steel stiffening member extends between the retractor mechanism and said guide ring to secure these parts to the collar and provide a smooth sliding surface for the leash as it is extended and retracted.

10 Claims, 8 Drawing Figures

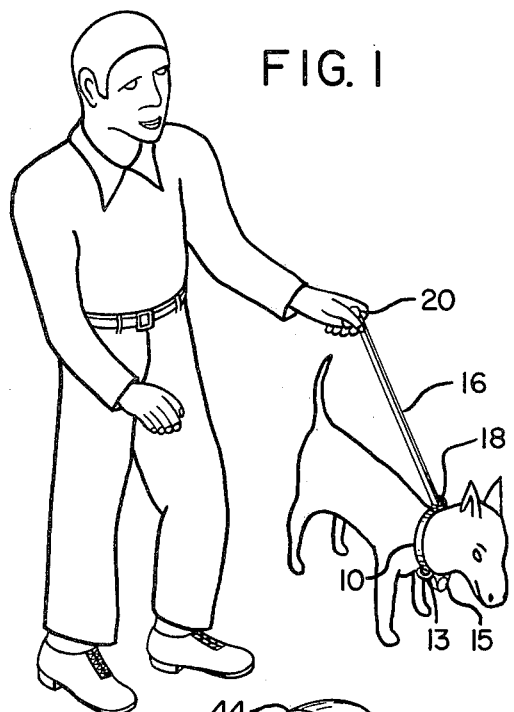
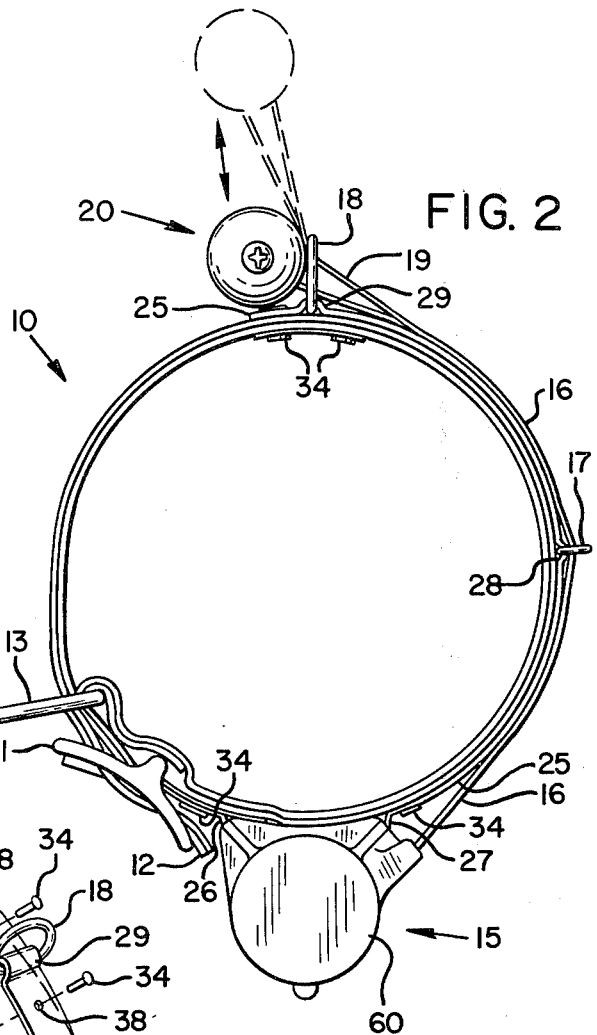
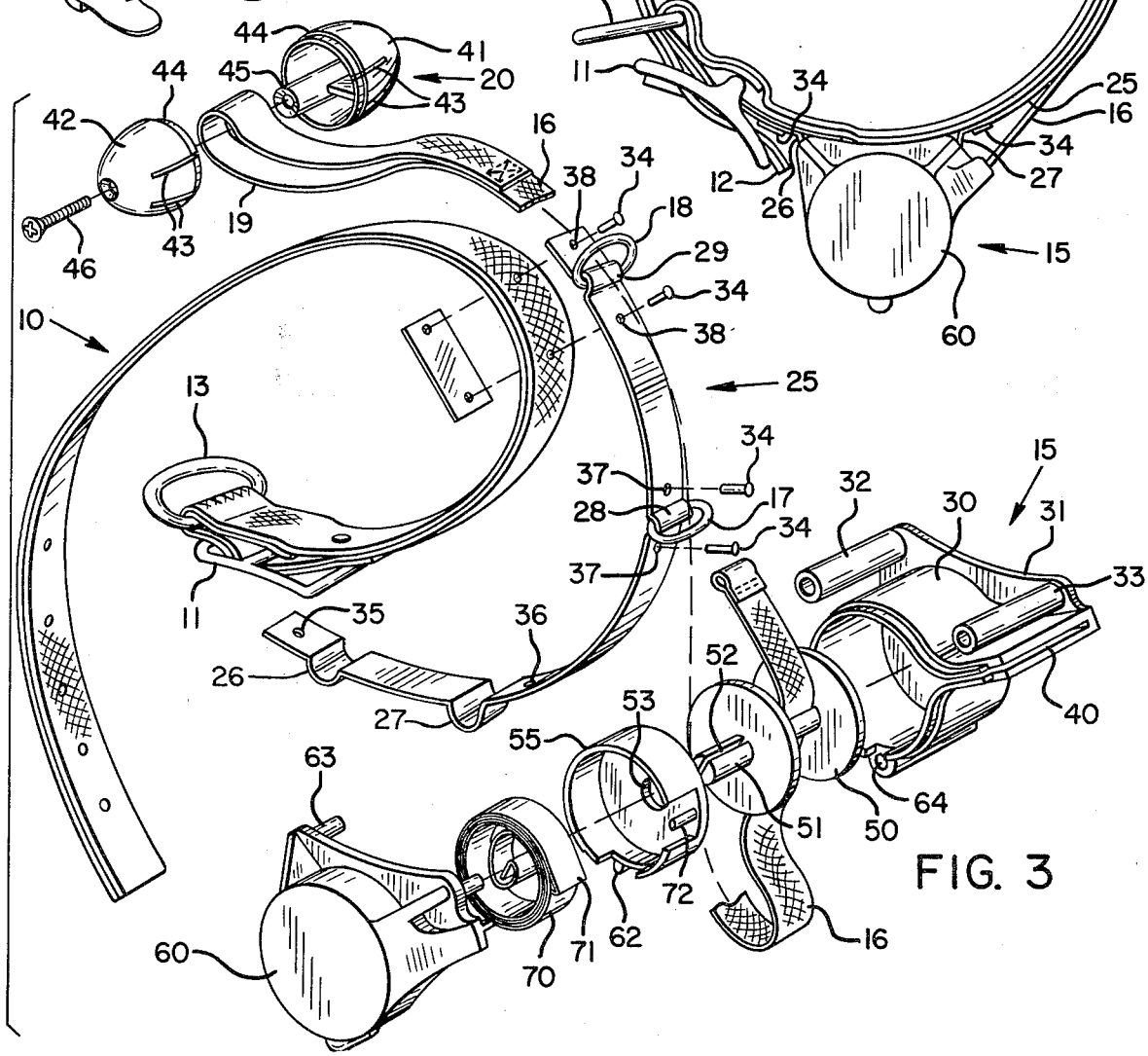
FIG. 1
FIG. 2
FIG. 3

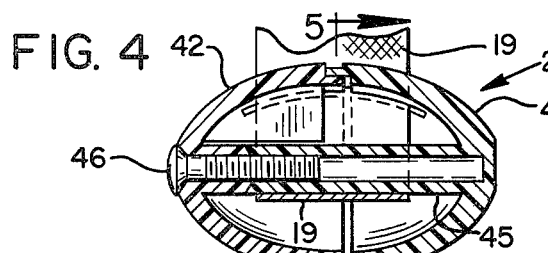
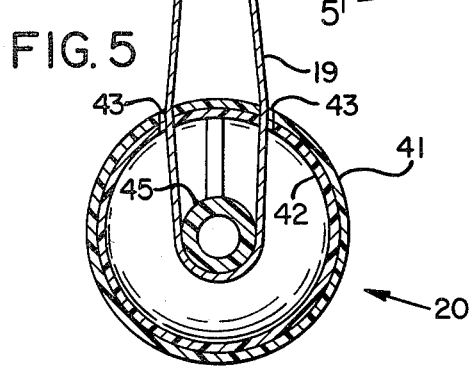
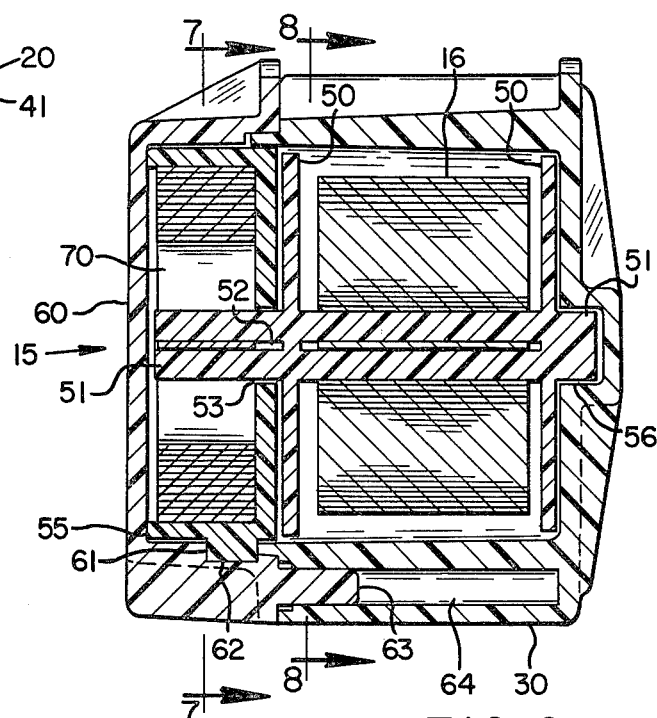
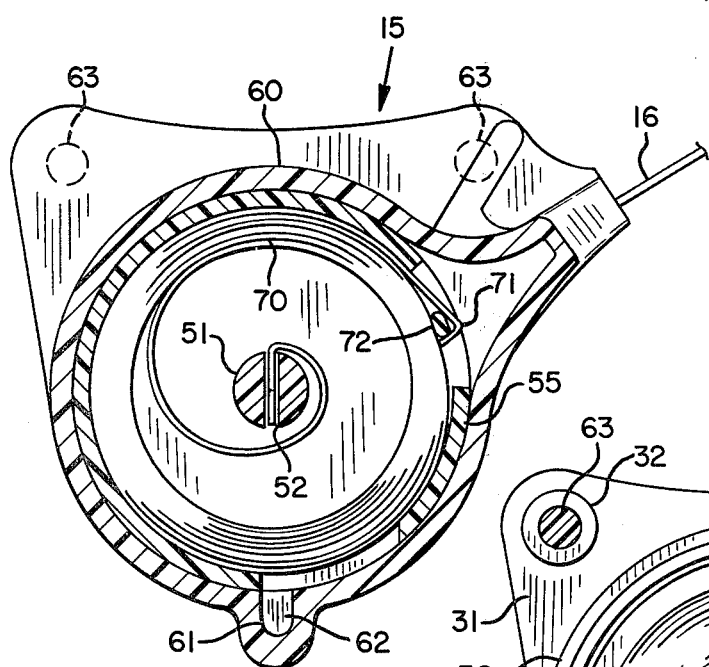
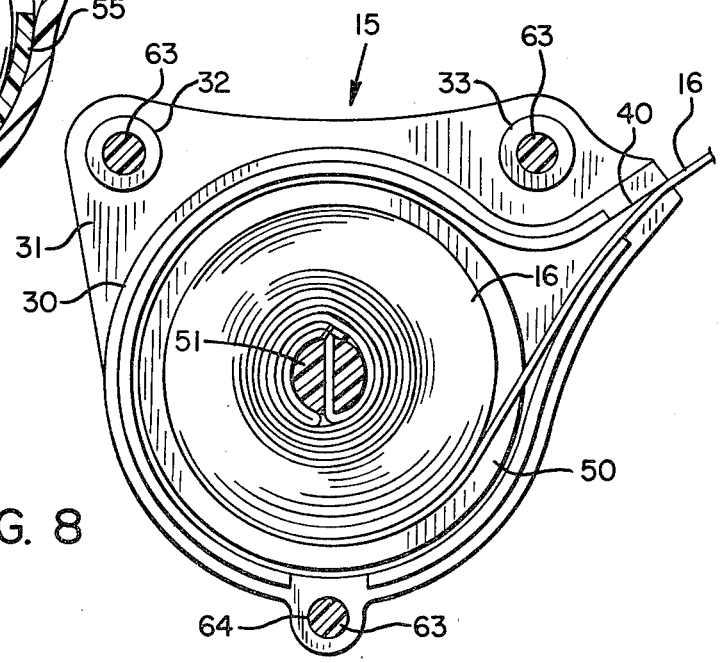

RETRACTABLE LEASH COLLAR

BACKGROUND OF THE INVENTION

This invention relates to a collar having a retractable leash for an animal, such as a dog.

In view of the myriad of leash laws and ordinances extant or under consideration by various municipalities there is a need for an improved leash for domestic animals. The leash must be immediately accessible, provide single hand control of the animal, provide quick availability, afford relief from the inconvenience of tangling in the dog's legs and enhance the mutual feeling of presence between animal and person. To fulfill these requirements the leash must have a retractor mechanism and such mechanism must be combined with the collar to operate as a single unit. This relieves the dog owner of a search for the leash before each outing, it relieves the owner of attempting to attach a leash snap onto the collar of an excited or an impatient animal and eliminates the problem of storage and availability when not in use.

In prior collars having a retractor mechanism the weight of the mechanism rotates the collar so that the handle of the retracted leash is normally carried on the underside of the animal's neck. This is not a convenient position for grasping in an emergency and the resulting rotation of the collar when the leash is pulled upward is irritating to the animal and destructive of the hair on the neck.

SUMMARY OF THE INVENTION

In the present leash collar the handle of the leash is not retracted to a position under the animal's neck but is retained in the most accessible position which is on the back of the neck of the animal. This is accomplished by training the leash through guide rings on a stiffening member extending halfway around the collar. The retractor mechanism is mounted adjacent to the buckle on the collar whereby the combined weight of retractor mechanism and buckle keeps these parts on the underside of the neck and holds the leash handle on top of the neck.

This not only provides convenience and accessibility for the leash handle but also minimizes rotation of the collar on the animal's neck. If the leash is pulled upward, backward or forward there is no rotation of the collar and if the leash is pulled upward and sideways there is only a slight rotation of the collar.

The stiffening member provides a smooth sliding surface for the leash in its extending and retracting movements around one side of the collar. The retractor mechanism is actuated by a special form of spring which maintains substantially uniform tension on the leash as it is extended and retracted. Thus the leash never drags on the ground and does not become entangled with the animal's legs. Also, the retractor mechanism maintains at all times the desired mutual feeling of presence between animal and person.

The invention will be better understood and the foregoing and additional objects and advantages will become apparent from the following description of the preferred embodiment illustrated in the accompanying drawings. Various changes may be made in details of construction and certain features may be used without others. All such modifications within the scope of the appended claims are included in the invention.

BRIEF DESCRIPTION OF THE DRAWINGS

FIG. 1 is a perspective view showing a person walking a dog wearing the present retractable leash collar.

FIG. 2 is an elevation view of the leash collar.

FIG. 3 is an exploded view of the leash collar and the retractor mechanism.

FIG. 4 is a longitudinal sectional view of the leash handle.

FIG. 5 is a view on the line 5—5 in FIG. 4.

FIG. 6 is a longitudinal sectional view of the retractor mechanism.

FIG. 7 is a view on the line 7—7 in FIG. 6.

FIG. 8 is a view on the line 8—8 in FIG. 6.

DESCRIPTION OF THE PREFERRED EMBODIMENT

In FIGS. 1 and 2 the collar 10 is made of double thickness nylon, leather or other suitable material. One end of the collar is secured to a conventional buckle 11 through which the free end 12 of the collar extends. Preferably a metal tethering ring 13 is mounted on the collar adjacent one end of buckle 11.

Mounted on collar 10 adjacent the opposite end of buckle 11 is a retractor mechanism 15 for a nylon ribbon leash 16. Leash 16 is trained halfway around the collar by a pair of guide rings 17 and 18, the latter being positioned on the collar approximately diametrically opposite retractor mechanism 15. The free end of the leash terminates in a hand loop 19 which is connected to a handle 20. Handle 20 is larger than the opening in guide ring 18 whereby this guide ring provides a stop for the handle when the leash is released and retracted by retractor mechanism 15 as shown in solid line in FIG. 2.

Handle 20 is a hollow shell of lightweight plastic construction whereby the combined weight of buckle 11, tethering 13 and retractor mechanism 15 containing most of the length of leash 16 far exceeds the combined weight of guide ring 18 and handle 20. Thus when the leash is in retracted position as shown in solid lines in FIG. 2 the relatively heavier parts 11, 13 and 15 gravitate to the underside of the animal's neck placing the handle 20 in its most convenient position for grasping, on top of the neck. Then when handle 20 is grasped and the leash pulled upward, backward or forward it does not rotate the collar on the neck of the animal and even if pulled sideways the collar is rotated through only a small angle.

Retractor mechanism 15 and guide rings 17 and 18 are mounted on the collar 10 by means of a stiffening member 25 which is preferably a flat strip of spring steel. As shown in FIG. 3 the stiffening member is preformed to semi-circular shape so as to hold the collar in circular configuration as shown in FIG. 2 when removed from the animal.

Stiffening member 25 is formed with four transverse upsets 26, 27, 28 and 29.

Retractor mechanism 50 is carried by a case 30 having a flange 31 on one end equipped with a pair of parallel studs 32 and 33, these parts preferably being moulded from plastic as a one piece unit. Studs 32 and 33 are received in the concave sides of upsets 26 and 27 and are clamped to the collar by rivets 34 in holes 35 and 36 in the stiffening member 25. In a similar manner a straight side of guide ring 17 is received in upset 28 and clamped to the collar by rivets 34 in a pair of holes 37 and a straight side of guide ring 18 is received in upset 29 and clamped to the collar by a pair of rivets 34 in holes 38.

Leash 16 issues from a slot 40 in case 30 and slides on the smooth surface of stiffening member 25 half-way around the collar to guide ring 18 when the leash is pulled out from and retracted back into case 30. As shown in FIGS. 1 and 2 the leash projects to the right side of the animal. By reversing the collar the leash will project to the left side, if desired.

As shown in FIGS. 3, 4 and 5 the handle 20 is of elipsoidal shape comprising a pair of hollow plastic shells 41 and 42. These shells have a pair of parallel longitudinal slots 43 to receive the opposite sides of the loop 19 on the end of leash 16. The shells have interfitting flanged ends 44 and the shell 41 has an axial stud 45 which extends through the loop 19 in the end of the leash. The parts are held in assembled relation by a screw 48 which has threaded engagement with a hole in stud 45.

Thus the handle 20 is of very light weight for the purpose previously explained. Loop 19 is large enough to receive the hand and wrist of the person controlling the leash so as to provide a strong and positive grasp on the leash whenever that may be necessary.

Referring now to FIGS. 3, 6, 7 and 8, the retractor mechanism 15 contains a plastic reel 50 for the leash 16. Reel 50 has a spindle 51 which projects beyond one end of the reel and contains a diametrical slot 52. A hole 53 in a cup-shaped plastic spring case 55 provides a bearing for the spindle 51 on one of the reel as shown in FIGS. 3 and 6 and a bearing 56 in the end of case 30 supports a hub 57 on the opposite end of reel 50 as shown in FIG. 6. Spring case 55 is contained in a plastic cap 60 which has a slot 61 to receive a lug 62 on the spring case to prevent rotation of the spring case. Cap 60 is mounted on case 30 by means of three integrally molded studs 63 which are adhesively secured in a hole 64 in case 30 and holes in studs 32 and 33.

The leash is retracted by a ribbon type steel coil spring 70 in spring case 55. The inner end of spring 70 is anchored in slot 52 in spindle 51 and the outer end 71 is anchored to a stud 72 on spring case 55 as shown in FIG. 7.

As previously mentioned, it is desirable to maintain constant tension on the leash as it is withdrawn from the retractor mechanism. This is accomplished by using an approximately constant tension coiled ribbon spring 70 as disclosed in the Foster U.S. Pat. Nos. 2,833,027 and 2,833,534.

Stiffening member 25 has four functions. First, it prevents tightening of the collar on the animal's neck when the leash 15 is tensioned by handle 20. Second, it provides a smooth sliding surface for leash 16 on the collar. Third, it secures retractor mechanism 15 and guide rings 17 and 18 to the collar. Fourth, it holds the buckled empty collar in approximately circular shape to present an attractive display at point of sale.

The present form of construction of the retractor mechanism 15 is quite effective in keeping out dirt and is not adversely affected by immersion in water.

What is claimed is:

1. An animal collar and leash comprising a collar, a leash retractor mechanism mounted on said collar, a leash having an inner end connected with said retractor mechanism, a handle on the outer end of the leash, a guide ring for said leash on said collar approximately half way around the collar from said retractor mechanism, said guide ring forming a stop for said handle to limit the retraction of the leash by said retractor mechanism, and a stiffening member on said collar extending from said retractor mechanism to said guide ring, said stiffening member having a smooth surface to facilate the sliding of the leash thereon as the leash is extended and retracted.

2. The invention of claim 1, said collar having a buckle, and said retractor mechanism being mounted adjacent said buckle.

3. The invention of claim 2 wherein the weight of said buckle and retractor mechanism exceeds the weight of said guide ring and handle sufficiently to hold said handle in a position on top of the neck of the animal.

4. The invention of claim 1, said stiffening member being preformed to semicircular shape.

5. The invention of claim 1, said leash having a loop at said handle of sufficient size to receive the hand of a person holding the leash.

6. The invention of claim 1, said handle comprising a hollow ellipsoidal knob containing an axial stud, a pair of parallel axial slots in said knob, and a loop in said outer end of the leash threaded through said slots and encircling said stud.

7. The invention of claim 1, said retractor mechanism being actuated by a coiled ribbon spring which exerts substantially constant tension on the leash as the leash is extended.

8. The invention of claim 1, said stiffening member comprising a flat strip of flexible material, said strip having a transverse upset adjacent one end to receive said guide ring and a pair of transverse upsets adjacent its other end to receive a pair of supporting studs on said retractor mechanism, and rivets adjacent said upsets securing said strip to said collar.

9. The invention of claim 8, said retractor mechanism comprising a case having a reel for said leash, said supporting studs being on said case, a cap on said case, a spring case in said cap, a coiled ribbon spring in said spring case, and a spindle in said reel extending into said spring case and connected to the inner ends of said leash and said spring.

10. A leash retractor mechanism comprising a generally cylindrical outer case having a closed end and an open end, a leash reel in said case having a spindle supported at one end in a bearing in said closed end of the case, a cap on said open end of the case, a cylindrical spring case in said cap having a bearing for the other end of said spindle, a coiled ribbon spring in said spring case connected to said spindle, and a pair of axial studs on said outer case parallel with said spindle for mounting the retractor mechanism on an animal collar with the axis of said reel transverse to the collar.

* * * * *